(12) United States Patent
Nashiki et al.

(10) Patent No.: US 8,003,200 B2
(45) Date of Patent: *Aug. 23, 2011

(54) TRANSPARENT ELECTRICALLY-CONDUCTIVE FILM

(75) Inventors: Tomotake Nashiki, Ibaraki (JP); Hideo Sugawara, Ibaraki (JP); Hidehiko Andou, Ibaraki (JP); Hidetoshi Yoshitake, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 843 days.

This patent is subject to a terminal disclaimer.

(21) Appl. No.: 11/664,583

(22) PCT Filed: Sep. 27, 2005

(86) PCT No.: PCT/JP2005/017741
§ 371 (c)(1),
(2), (4) Date: Apr. 4, 2007

(87) PCT Pub. No.: WO2006/038494
PCT Pub. Date: Apr. 13, 2006

(65) Prior Publication Data
US 2008/0096013 A1 Apr. 24, 2008

(30) Foreign Application Priority Data
Oct. 6, 2004 (JP) ................. 2004-293824

(51) Int. Cl.
*B32B 7/02* (2006.01)
(52) U.S. Cl. ..... 428/212; 428/690; 428/917; 428/411.1; 313/504; 313/506; 257/431; 257/449
(58) Field of Classification Search ............. 428/212, 428/690, 917, 411.1; 313/504, 506; 257/431, 257/449
See application file for complete search history.

(56) References Cited

U.S. PATENT DOCUMENTS

| | | | |
|---|---|---|---|
| 5,645,901 A | 7/1997 | Fukuchi et al. | |
| 6,399,222 B2 | 6/2002 | Arai et al. | |
| 6,603,085 B2 | 8/2003 | Oya et al. | |
| 6,611,090 B1* | 8/2003 | Ishikawa et al. ......... | 313/461 |
| 6,665,029 B2 | 12/2003 | Kondo et al. | |
| 6,720,955 B2 | 4/2004 | Sugawara et al. | |
| 7,190,354 B2 | 3/2007 | Tanaka et al. | |
| 2001/0037935 A1 | 11/2001 | Oya et al. | |
| 2002/0158853 A1 | 10/2002 | Sugawara et al. | |
| 2003/0186040 A1 | 10/2003 | Oya | |
| 2005/0237307 A1 | 10/2005 | Hieda et al. | |
| 2006/0108050 A1 | 5/2006 | Satake et al. | |
| 2008/0020202 A1 | 1/2008 | Nashiki et al. | |

FOREIGN PATENT DOCUMENTS

| | | |
|---|---|---|
| CN | 1253634 A | 5/2000 |
| CN | 1328656 A | 12/2001 |
| EP | 1016893 A1 | 7/2000 |
| EP | 1 452 556 A1 | 9/2004 |
| JP | 2-5308 A | 1/1990 |
| JP | 2005-308 A | 1/1990 |
| JP | 8-132554 A | 5/1996 |
| JP | 8-167726 A | 6/1996 |
| JP | 11-216794 A | 8/1999 |
| JP | 11-286066 A | 10/1999 |
| JP | 2000-40896 A | 2/2000 |
| JP | 2002-73282 A | 3/2002 |
| JP | 2002-117724 A | 4/2002 |
| JP | 2002-326301 A | 11/2002 |
| JP | 2003-2985 A | 1/2003 |
| JP | 2003-094548 A | 4/2003 |
| JP | 2003-236969 A | 8/2003 |
| JP | 2003-320609 A | 11/2003 |
| JP | 2004-046728 A | 2/2004 |
| JP | 2004-170907 A | 6/2004 |
| JP | 2004-259256 A | 9/2004 |
| JP | 2004-322380 A | 11/2004 |
| JP | 2006-139750 A | 6/2006 |
| JP | 2006-179274 A | 7/2006 |
| KR | 2001-0093732 A | 10/2001 |
| TW | 550598 B | 9/2003 |
| TW | 562736 B | 11/2003 |
| TW | 574515 | 2/2004 |
| WO | WO 00/20917 A1 | 4/2000 |
| WO | WO 03/000779 A1 | 1/2003 |
| WO | 2004/038464 A1 | 5/2004 |
| WO | 2004/070605 A1 | 8/2004 |
| WO | 2005/106897 A1 | 11/2005 |

OTHER PUBLICATIONS

International Search Report of PCT/JP2005/017741, date of mailing Jan. 10, 2006.
International Preliminary Report dated Apr. 19, 2007, issued in International Application No. PCT/JP2005/017741 (Forms PCT/IB/338 and PCT/IB/373 and PCT/ISA/237).
Chinese Office Action dated Dec. 28, 2007, issued in corresponding Chinese Patent Application No. 2005800288535.

(Continued)

*Primary Examiner* — David Sample
*Assistant Examiner* — Lawrence Ferguson
(74) *Attorney, Agent, or Firm* — Westerman, Hattori, Daniels & Adrian, LLP

(57) ABSTRACT

A transparent electrically-conductive film of the present invention comprises a transparent film substrate, a hard coat layer formed on one side of the transparent film substrate, a $SiO_x$ layer with a thickness of 10 nm to 300 nm that is formed on the hard coat layer by a dry process, and a transparent electrically-conductive thin layer with a thickness of 20 nm to 35 nm that is formed on another side of the transparent film substrate. The transparent electrically-conductive film has good resistance to moisture and heat and high durability against pen-based input and can be prevented from cracking during a punching process and also prevented from waving or curling even in a high-temperature, high-humidity environment.

18 Claims, 2 Drawing Sheets

OTHER PUBLICATIONS

Taiwan Office Action, issued in corresponding Chinese Patent Application No. 94133872, 1997.
Taiwanese Office Action dated Nov. 27, 2009, issued in corresponding Taiwanese Patent Application No. 095129746.
Chinese Office Action dated Aug. 14, 2009, issued in corresponding Chinese Patent Application No. 2006101121901.
Korean Office Action dated Sep. 3, 2010, issued in related Korean Patent Application No. 10-2008-7031998.
Korean Office Action dated Sep. 3, 2010, issued in related Korean Patent Application No. 10-2010-7011046.
Korean Office Action dated Mar. 31, 2010, issued in related Korean patent Application No. 10-2008-7031998.
International Search Report of PCT/JP2007/061558, Mailing Date of Jul. 31, 2007.
Notification of Transmittal of Translation of the International Preliminary Report on Patentability (Form PCT/IB/338) of International Application No. PCT/JP2007/061558 mailed Feb. 19, 2009 with Forms PCT/IB/373 and PCT/ISA/237.
Japanese Office Action dated Oct. 20, 2010, issued in related Japanese Patent Application No. 2005-273557.

* cited by examiner

[FIG.1]
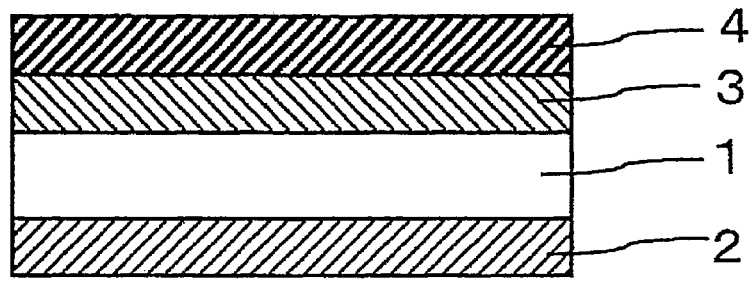
[FIG.2]
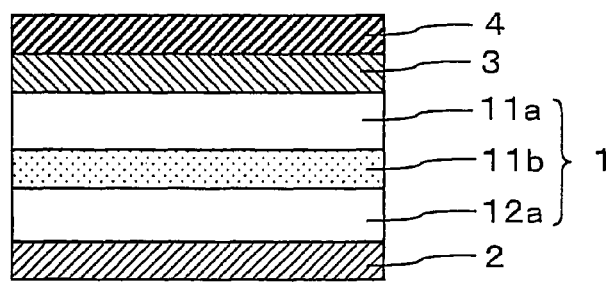
[FIG.3]
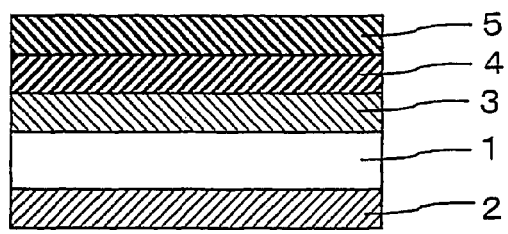
[FIG.4]
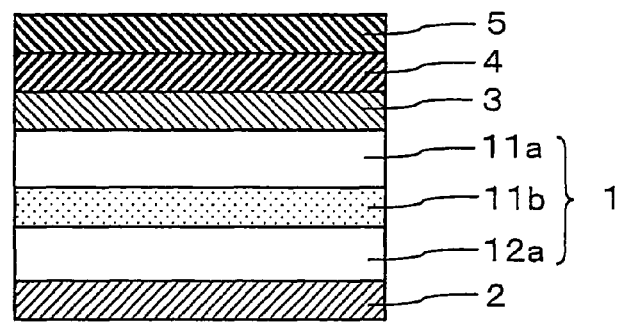

[FIG.5]
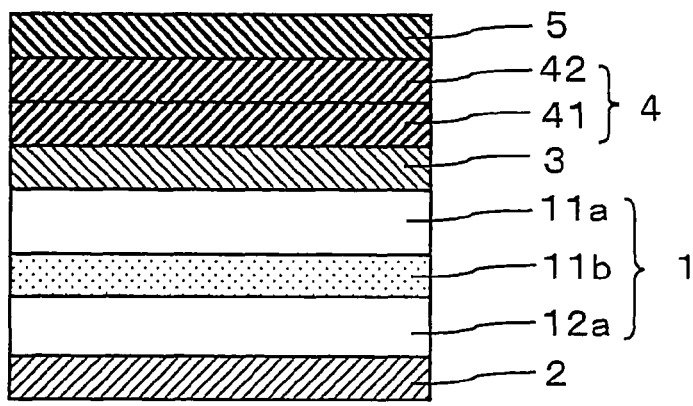
[FIG.6]
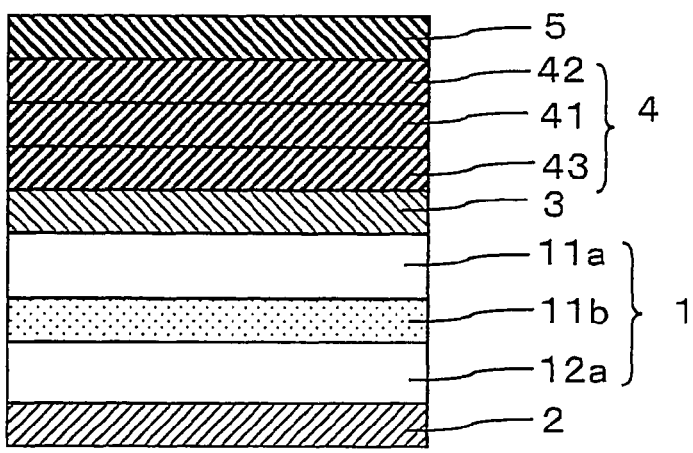
[FIG.7]
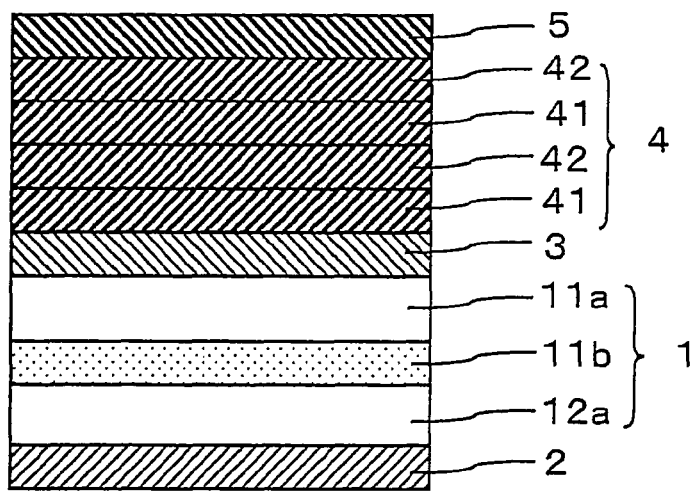

TRANSPARENT ELECTRICALLY-CONDUCTIVE FILM

TECHNICAL FIELD

The invention relates to a transparent electrically-conductive film that is transparent in the visible light region and has electrical conductivity. The invention also relates to a touch panel using the transparent electrically-conductive film. The transparent electrically-conductive film may be used for transparent electrodes in touch panels and advanced display systems such as liquid crystal displays and electroluminescence displays and used for electromagnetic wave shielding or prevention of static charge of transparent products.

BACKGROUND ART

Conventionally, so-called electrically-conductive glass is well known as a transparent electrically-conductive thin layer, which includes a glass and an indium oxide thin layer formed thereon. Since the electrically-conductive glass has a glass substrate, however, it has low flexibility or workability and cannot be used for certain purposes. In recent years, therefore, transparent electrically-conductive films using various types of plastic films such as polyethylene terephthalate films as their substrates have been used, because of their advantages such as good impact resistance and light weight as well as flexibility and workability.

The conventional transparent electrically-conductive films using such film substrates not only have the problem of low transparency due to high light reflectance of the thin film surface but also have low scratch resistance or low bending resistance so that they can have problems in which they can get scratched to have an increased electrical resistance or suffer from disconnection during use. They also have the problem of low environmental resistance.

Touch panels using such transparent electrically-conductive films also have a problem in which Newton's rings can be caused by film waving or curling to degrade their visibility. To resolve this problem, for example, there is proposed a transparent electrically-conductive film including a laminate of a hard-coated film and an electrically-conductive film, wherein the difference between the longitudinal and transverse thermal shrinkage rates of a transparent substrate and a hard coat layer that form the hard-coated film is controlled to a low level (see Patent Literature 1: JP-A No. 2002-73282). The transparent electrically-conductive film described in Patent Literature 1 can hardly cause curling during heating processes, but its resistance to moisture and heat is not sufficient, and it can cause curling due to environmental change during storage, transportation or the like or can cause curling in a high-temperature, high-humidity environment. It is also proposed that a metal oxide layer and a cured layer of a shrinkable curable resin are formed in this order on the side opposite to the transparent electrically-conductive layer in the transparent electrically-conductive film so that convex curling caused by the metal oxide layer can be canceled by the cured layer of the shrinkable curable resin (see Patent Literature 2: JP-A No. 11-216794). In Patent Literature 2, a polysiloxane thermosetting resin is generally used for the cured layer of the shrinkable curable resin, but the cured layer formed by applying the polysiloxane thermosetting resin and curing it has low resistance to moisture and heat and can cause curling in a high-temperature, high-humidity environment. To resolve this problem, there is also proposed a transparent electrically-conductive film including a film substrate, hard coat layers formed on both sides of the substrate, a transparent electrically-conductive thin layer formed on one side, and a metal oxide (such as $SiO_x$) thin layer formed on the other side (see Patent Literature 3: JP-A No. 02-5308). However, the hard coat layers formed on both sides can reduce the flexibility of the film so that the durability against pen-based input can be insufficient or cracking can easily occur during a punching process.

DISCLOSURE OF THE INVENTION

Problems to be solved by the Invention

It is an object of the invention to provide a transparent electrically-conductive film that has good resistance to moisture and heat and high durability against pen-based input and can be prevented from cracking during a punching process and also prevented from waving or curling even in a high-temperature, high-humidity environment.

It is another object of the invention to provide a touch panel using such a transparent electrically-conductive film.

Means for Solving the Problems

As a result of active investigations for solving the above problems, the inventors have found that the objects can be achieved by the transparent electrically-conductive film and touch panel described below, and have completed the invention.

The present invention relates to a transparent electrically-conductive film, comprising: a transparent film substrate;
a hard coat layer formed on one side of the transparent film substrate;
a $SiO_x$ layer with a thickness of 10 nm to 300 nm that is formed on the hard coat layer by a dry process; and
a transparent electrically-conductive thin layer with a thickness of 20 nm to 35 nm that is formed on another side of the transparent film substrate.

The transparent electrically-conductive film of the invention includes a transparent film substrate and a transparent electrically-conductive thin layer with a specific thickness formed on one side of the substrate, and a hard coat layer and a $SiO_x$ layer with a specific thickness formed by a dry process, which are formed on the other side of the substrate. The hard coat layer can increase chemical resistance and scratch resistance. The transparent electrically-conductive thin layer with a specific thickness and the $SiO_x$ layer with a specific thickness formed on the side opposite to the thin film can equally control moisture intrusion to both sides of the film substrate even in a high-temperature, high-humidity environment, so that waving and curling can be prevented. Thus, the transparent electrically-conductive film of the invention has good resistance to moisture and heat and resists waving and curling so that it can hardly cause Newton's rings, which would otherwise be caused by waving or curling, and can form a touch panel with stable visibility. The transparent electrically-conductive film of the invention with such a structure has flexibility and good durability against pen-based input and can be prevented from cracking during a punching process.

The thickness of the $SiO_x$ layer is from 10 to 300 nm. If the thickness is less than 10 nm, it will be difficult to stably form the $SiO_x$ layer in a continuous manner and waving or curling cannot be suppressed to a low level. If the thickness exceeds 300 nm, the $SiO_x$ layer can suffer from cracking or the like and cannot have stable performance. From this point of view, the thickness of the $SiO_x$ layer is preferably from 10 to 200 nm, more preferably from 20 to 150 nm. The $SiO_x$ layer to be used is formed by a dry process. Even with a thickness falling within the above range, $SiO_x$ layers formed by a wet process including applying a thermosetting polysiloxane resin, a silica sol or the like have difficulty in controlling moisture intrusion to the film substrate, and have insufficient resistance to moisture and heat, so that they cannot suppress waving or curling to a low level in a high-temperature, high-humidity environment.

The transparent electrically-conductive film preferably has a water vapor transmission rate of 2 g/(m²·24 hr·atm) or less on the $SiO_x$ layer side. If the water vapor transmission rate is set 2 g/(m²·24 hr·atm) or less, moisture intrusion to both sides of the film substrate can be controlled more equally with reference to the transparent electrically-conductive thin layer side, so that waving and curling can be further prevented. The water vapor transmission rate is preferably 1.5 g/(m²·24 h·atm) or less.

On the other hand, the thickness of the transparent electrically-conductive thin layer is from 20 to 35 nm. If the thickness is less than 20 nm, the surface resistance can tend to be high, and it would be difficult to stably form the transparent electrically-conductive thin layer in a continuous manner. If the thickness exceeds 35 nm, a reduction in transparency and the like can occur. From this point of view, the thickness of the transparent electrically-conductive thin layer is preferably from 20 to 35 nm, more preferably from 21 to 29 nm.

The transparent electrically-conductive film preferably further comprises an anti-fouling layer on the $SiO_x$ layer. The formation of the anti-fouling layer can prevent staining and improve pen sliding properties.

In the transparent electrically-conductive film, a laminate of at least two transparent film substrates that are bonded to one another through a transparent adhesive layer may be used as the transparent film substrate.

In the transparent electrically-conductive film, the transparent electrically-conductive thin layer is preferably made of indium tin oxide.

In the transparent electrically-conductive film, the $SiO_x$ layer preferably has a refractive index of 1.40 to 2.00.

In the transparent electrically-conductive film, the $SiO_x$ layer can be formed with at least a $SiO_x$ layer (1) whose refractive index is adjusted to 1.7 to 1.9 and a $SiO_x$ layer (2) whose refractive index is adjusted to 1.4 to 1.49 are laminated in this order from the hard coat layer side.

In the transparent electrically-conductive film, the $SiO_x$ layer can be formed with three layers which comprises a $SiO_x$ layer (3) whose refractive index is adjusted to 1.5 to 1.69, a $SiO_x$ layer (1) whose refractive index is adjusted to 1.7 to 1.9 and a $SiO_x$ layer (2) whose refractive index is adjusted to 1.4 to 1.49 are laminated in this order from the hard coat layer side.

In the transparent electrically-conductive film, the $SiO_x$ layer can be formed with four layers in total which comprise a $SiO_x$ layer (1) whose refractive index is adjusted to 1.7 to 1.9 and a $SiO_x$ layer (2) whose refractive index is adjusted to 1.4 to 1.49 are alternately laminated twice in this order from the hard coat layer side.

The refractive index of the $SiO_x$ layer (1) is preferably from 1.75 to 1.85. The refractive index of the $SiO_x$ layer (2) is preferably from 1.42 to 1.47. The refractive index of the $SiO_x$ layer (3) is preferably from 1.55 to 1.65.

If the $SiO_x$ layer is composed of at least two layers each with a controlled refractive index, as mentioned above, not only the resistance to moisture and heat but also the anti-reflection function can be improved, and the transparency of the transparent electrically-conductive film can also be improved.

The present invention also related to a touch panel, comprising:

a pair of panel plates each having a transparent electrically-conductive thin layer; and a spacer through which the pair of panel plates are arranged opposite to each other in such a manner that the transparent electrically-conductive thin layers are placed opposite to each other, wherein at least one of the panel plates is the transparent electrically-conductive film.

The touch panel using the above-mentioned transparent electrically-conductive film as a panel plate resists waving and curling. Thus, there can be provided touch panels that can hardly cause Newton's rings, which would otherwise be caused by waving or curling, and have stable visibility.

BRIEF DESCRIPTION OF DRAWINGS

FIG. 1 is a cross-sectional diagram showing an example of the transparent electrically-conductive film according to the invention;

FIG. 2 is a cross-sectional diagram showing an example of the transparent electrically-conductive film according to the invention;

FIG. 3 is a cross-sectional diagram showing an example of the transparent electrically-conductive film according to the invention;

FIG. 4 is a cross-sectional diagram showing an example of the transparent electrically-conductive film according to the invention;

FIG. 5 is a cross-sectional diagram showing an example of the transparent electrically-conductive film according to the invention;

FIG. 6 is a cross-sectional diagram showing an example of the transparent electrically-conductive film according to the invention;

FIG. 7 is a cross-sectional diagram showing an example of the transparent electrically-conductive film according to the invention.

DESCRIPTION OF THE REFERENCE NUMERALS

In the drawings, reference mark 1 represents a transparent film substrate, 11a a transparent film substrate, 12a a transparent film substrate, 11b a pressure-sensitive adhesive layer, 2 a transparent electrically-conductive thin layer, 3 a hard coat layer, 4 a $SiO_x$ layer, 41 a $SiO_x$ layer whose refractive index is adjusted to 1.7 to 1.9, 42 a $SiO_x$ layer whose refractive index is adjusted to 1.4 to 1.49, 43 a $SiO_x$ layer whose refractive index is adjusted to 1.5 to 1.69, and 5 an anti-fouling layer.

BEST MODE FOR CARRYING OUT THE INVENTION

The invention is described below with reference to the drawings. FIG. 1 shows an example of the transparent electrically-conductive film of the invention, which includes a transparent film substrate 1, a transparent electrically-conductive thin layer 2 placed on one side of the substrate 1, a hard coat layer 3 placed on the other side of the substrate 1, and a $SiO_x$ layer 4 placed on the hard coat layer 3.

In FIG. 1, a single transparent film substrate 1 is used as the transparent film substrate 1. FIG. 2 shows another example where a laminate 1 of a transparent film substrate 11a and another transparent film substrate 12a bonded to each other through a pressure-sensitive adhesive layer 11b is used in place of the transparent film substrate 1 of the transparent electrically-conductive film of FIG. 1. While two transparent film substrates are laminated in FIG. 2, three or more transparent film substrates may be laminated. In the invention, such a laminate may be used as the transparent film substrate 1. FIG. 3 shows a further example where the transparent electrically-conductive film according to FIG. 1 further includes an anti-fouling layer 5 on the $SiO_x$ layer 4. FIG. 4 shows a further example where the transparent electrically-conductive film according to FIG. 2 further includes an anti-fouling layer 5 on the $SiO_x$ layer 4.

FIGS. 5 to 7 show cases where the $SiO_x$ layer 4 is a laminate of at least (1) a $SiO_x$ layer 41 whose refractive index is adjusted to 1.7 to 1.9 and (2) a $SiO_x$ layer 42 whose refractive index is adjusted to 1.4 to 1.49. In FIG. 5, two layers: the $SiO_x$ layer 41 and the $SiO_x$ layer 42 are laminated in this order from the hard coat layer side. In FIG. 6, three layers: (3) a $SiO_x$ layer 43 whose refractive index is adjusted to 1.5 to 1.69 and the $SiO_x$ layer 41 and the $SiO_x$ layer 42 are laminated in this order from the hard coat layer side. In FIG. 7, the $SiO_x$ layer 41 and the $SiO_x$ layer 42 are alternately laminated twice, that is four layers in total, in this order from the hard coat layer side. While FIGS. 5 to 7 illustrate cases where the $SiO_x$ layer 4 is composed of a plurality of layers in the structure according to FIG. 4, the $SiO_x$ layer 4 may also be composed of a plurality of layers in the structure according to any one of FIGS. 1 to 3.

The transparent film substrate 1 for use in the transparent electrically-conductive film of the invention may be a single transparent film substrate or a laminate of two or more transparent film substrates that are bonded to one another through a pressure-sensitive adhesive layer or layers.

Any material properly selected from a variety of transparent materials may be used as the material for the transparent film substrate without particular limitation. Examples of such materials include polyester resins, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, and polyphenylene sulfide resins. In particular, polyester resins, polycarbonate resins, and polyolefin resins are preferred.

The surface of the transparent film substrate may be previously subjected to an etching process such as sputtering, corona discharge, flame treatment, ultraviolet irradiation, electron beam irradiation, chemical treatment, and oxidation, or an undercoating process such that it can have improved adhesion to the $SiO_x$ layer or the transparent electrically-conductive thin layer, which is to be formed thereon. If necessary, the transparent film substrate may also be subjected to dust removing or cleaning by solvent cleaning, ultrasonic cleaning or the like, before the $SiO_x$ layer or the transparent electrically-conductive thin layer is formed thereon.

The thickness of the transparent film substrate 1 is preferably from about 75 to about 400 μm, more preferably from 100 to 200 μm. The transparent film substrate with a thickness less than 75 μm can have problems with durability and workability. The transparent film substrate with a thickness more than 400 μm is not preferred, because it can increase the size of the touch panel component and can require a high load for touch panel input performance.

When the transparent film substrate 1 is a laminate of two or more transparent film substrates, at least one of the film substrates preferably has a thickness of 20 to 125 μm, while any appropriate thickness and material may be selected for each film substrate.

Any transparent pressure-sensitive adhesive layer may be used without particular limitation, when the transparent film substrate 1 is formed of a laminate of transparent film substrates. For example, acrylic pressure-sensitive adhesives, silicone pressure-sensitive adhesives, rubber pressure-sensitive adhesives, or the like may be used. The pressure-sensitive adhesive layer has the function of improving the scratch resistance of the transparent electrically-conductive thin layer 2 formed on one side of the film substrate 1 and improving the tap properties of the thin layer 2 for touch panels, based on its cushion effect after the bonding of the transparent substrates. In terms of performing this function better, it is preferred that the elastic modulus of the pressure-sensitive adhesive layer should be set in the range of 1 to 100 $N/cm^2$ and that its thickness should be set at 1 μm or more, generally in the range of 5 to 100 μm.

If the elastic modulus is less than 1 $N/cm^2$, the pressure-sensitive adhesive layer can be inelastic so that the adhesive layer can easily deform by pressing to make the film substrate 1 irregular and further to make the transparent electrically-conductive thin layer 2 irregular. If the elastic modulus is less than 1 $N/cm^2$, the pressure-sensitive adhesive can easily squeeze out of the cut section, and the effect of improving the scratch resistance of the transparent electrically-conductive thin layer 2 or improving the tap properties of the thin layer 2 for touch panels can be reduced. If the elastic modulus is more than 100 $N/cm^2$, the pressure-sensitive adhesive layer can be hard, and the cushion effect cannot be expected, so that the scratch resistance of the transparent electrically-conductive thin layer 2 or the tap properties of the thin layer 2 for touch panels cannot be improved. If the thickness of the pressure-sensitive adhesive layer is less than 1 μm, the cushion effect also cannot be expected so that an improvement in the scratch resistance of the electrically-conductive thin layer or an improvement in the tap properties of the electrically-conductive thin layer for touch panels cannot be expected. If it is too thick, it can reduce the transparency, or it can be difficult to obtain good results on the formation of the pressure-sensitive adhesive layer, the bonding workability of the film substrate, and the cost.

Any thin layer material may be used without particular limitation to form the transparent electrically-conductive thin layer 2. For example, a tin oxide-containing indium oxide material, an antimony-containing tin oxide material and the like are preferably used. Examples of methods for forming the transparent electrically-conductive thin layer 2 include vacuum deposition methods, sputtering methods, ion plating methods, and coating methods. Any appropriate method may be used depending on the type of the material and the desired layer thickness. In particular, a tin oxide-containing indium oxide material (indium tin oxide, ITO) is preferred. As stated above, the thickness of the transparent electrically-conductive thin layer 2 is from 20 to 35 nm. The transparent electrically-conductive thin layer 2 is preferably a continuous coating layer having good electrical conductivity characterized by a surface resistance of $1 \times 10^3$ Ω/square or less.

Examples of the material for the hard coat layer 3 formed on the transparent film substrate 1 side opposite to the transparent electrically-conductive thin layer 2 include urethane resins, melamine resins, alkyd resins, epoxy resins, acrylic resins, polyester resins, polyvinyl alcohol resins such as polyvinyl alcohol and ethylene-vinyl alcohol copolymers, vinyl chloride resins, and vinylidene chloride resins. The hard coat layer may also be formed using polyarylate resins, sulfone resins, amide resins, imide resins, polyethersulfone resins, polyetherimide resins, polycarbonate resins, silicone resins, fluororesins, polyolefin resins, styrene resins, vinylpyrrolidone resins, cellulose resins, acrylonitrile resins, or the like. Among these resin materials, urethane resins are preferred, and in particular urethane acrylate is preferably used. A blend of two or more appropriate resins may also be used to form the resin layer.

The hard coat layer 3 may also be formed to serve as an anti-glare layer. For example, the anti-glare layer is preferably formed of a cured coating layer composed of the hard coat layer-forming resin and inorganic or organic material particles dispersed therein. Alternatively, the anti-glare layer may be formed by mechanically modifying the surface profile of the hard coat layer by blasting, stamping or the like. Inorganic or organic filler may be dispersed into the material for forming the hard coat layer so that the resulting hard coat layer can serve as a Newton's rings-preventing layer.

The $SiO_x$ layer 4 with a thickness of 10 to 300 nm that is formed by a dry process is provided on the hard coat layer 3. The dry process may be vacuum deposition, sputtering, ion plating, or the like. The $SiO_x$ preferably has a refractive index of 1.40 to 2.00. In the $SiO_x$ layer, x may be from 1.0 to 2.0.

In the transparent electrically-conductive film of the invention, the $SiO_x$ layer 4 that is formed by a dry process so as to have the above thickness allows control such that the water vapor transmission rate from the $SiO_x$ layer 4 side can be equal to the water vapor transmission rate from the transparent electrically-conductive thin layer 2 side. The water vapor transmission rate from the $SiO_x$ layer 4 side is preferably 2 g/(m²·24 hr·atm) or less, more preferably 1.5 g/(m²·24 hr·atm) or less. The water vapor transmission rate from the transparent electrically-conductive thin layer 2 side is preferably the same as mentioned above.

While the $SiO_x$ layer may consist of a single layer, it may be composed of two or more layers different in the refractive index so that it can have an improved anti-reflection function. When the $SiO_x$ layer is formed of two or more layers, the total thickness of the $SiO_x$ layer is adjusted to 10 to 300 nm.

If the $SiO_x$ layer is composed of two or more layers, at least a $SiO_x$ layer (1) whose refractive index is adjusted to 1.7 to 1.9 and a $SiO_x$ layer (2) whose refractive index is adjusted to 1.4 to 1.49 may be laminated in this order from the hard coat layer side. If the $SiO_x$ layer is composed of three layers, a $SiO_x$ layer (3) whose refractive index is adjusted to 1.5 to 1.69, the $SiO_x$ layer (1) whose refractive index is adjusted to 1.7 to 1.9 and the $SiO_x$ layer (2) whose refractive index is adjusted to 1.4 to 1.49 may be laminated in this order from the hard coat layer side. When the $SiO_x$ layer is composed of four layers, the $SiO_x$ layer (1) whose refractive index is adjusted to 1.7 to 1.9 and the $SiO_x$ layer (2) whose refractive index is adjusted to 1.4 to 1.49 may be alternately laminated twice, that is four layers in total, in this order from the hard coat layer side. When the $SiO_x$ layer is composed of two or more layers, the thickness of each layer is optically designed so as to achieve an anti-reflection function. Although not specifically described herein, five or more layers may form the $SiO_x$ layer, and in such cases, the refractive index and thickness of each $SiO_x$ layer to be laminated may be appropriately determined from the optical design viewpoint of achieving the anti-reflection function.

If necessary, an anti-fouling layer 5 may be formed on the $SiO_x$ layer 4 in order to impart pen sliding properties or anti-fouling properties. Resins such as fluororesins, silicone resins, melamine resins, and acrylic resins, silane coupling agents, waxes, and the like are preferably used for the anti-fouling layer. The anti-fouling layer 5 may be formed by known conventional methods such as wet processes typified by reverse coating, die coating and gravure coating, and dry processes such as CVD. The anti-fouling layer 5 may also serves as an anti-reflection layer. The thickness of the anti-fouling layer 5 is generally from 1 to 50 nm, preferably from 1 to 30 nm.

The transparent electrically-conductive film of the invention may also include an anchor coat layer, an adhesion-facilitating layer, or the like between the respective layers, typically between the transparent film substrate 1 and the electrically-conductive thin layer 2, between the transparent film substrate 1 and the hard coat layer 3, between the hard coat layer 3 and the $SiO_x$ layer 4, between the $SiO_x$ layer 4 and the anti-fouling layer 5, or between each transparent film substrate and the pressure-sensitive adhesive layer in the transparent film substrate 1 formed of a laminate.

The anchor coat layer or the adhesion-facilitating layer to be used is preferably a curing coating layer made of a curable resin such as melamine resins, urethane resins, alkyd resins, acrylic resins, epoxy resins, and silicone resins. Any of these materials may be used alone or in combination to form a hybrid type. An inorganic oxide material including $SiO_2$, $TiO_2$, NaF, $Na_3AlF_6$, LiF, $MgF_2$, $CaF_2$, $BaF_2$, SiO, $SiO_x$, $LaF_3$, $CeF_3$, $Al_2O_3$, $CeO_2$, $Nd_2O_3$, $Sb_2O_3$, $Ta_2O_5$, $ZrO_2$, ZnO, ZnS, or the like, a mixture of such an inorganic oxide material and an organic substance such as acrylic resins, urethane resins, and siloxane polymers may also be used. When the anchor coat layer or the adhesion-facilitating layer is formed, its thickness is preferably at most 300 nm, more preferably from 10 to 300 nm.

The transparent electrically-conductive film of the invention may be produced by any method. In the case where a single transparent film substrate is used to form the substrate 1 of the transparent electrically-conductive film (as shown in FIG. 1), the hard coat layer 3 and the $SiO_x$ layer 4 may be formed on one side of the transparent film substrate 1, while the transparent electrically-conductive thin layer 2 may be formed on the other side of the transparent film substrate 1. In the case where two transparent film substrates are used to form the substrate 1 (as shown in FIG. 2), the hard coat layer 3 and the $SiO_x$ layer 4 may be formed in the same manner on the laminate 1 of the transparent film substrates 11a and 12a which are bonded to each other through the pressure-sensitive adhesive layer 11b, while the transparent electrically-conductive thin layer 2 may be formed on the other side of the laminate 1. Alternatively, the transparent electrically-conductive thin layer 2 may be formed on one side of a single transparent film substrate 11a, while the hard coat layer 3 and the $SiO_x$ layer 4 may be formed on one side of another single transparent film substrate 12a, and then the thin layer-free sides of the transparent film substrates 11a and 12a may be bonded to each other with a transparent pressure-sensitive adhesive layer 11b. The bonding may be performed by a process including the steps of forming the pressure-sensitive adhesive layer 11b on one or both sides of the transparent film substrates 11a and 12a and laminating them.

The transparent electrically-conductive film of the invention preferably has a light transmittance of 86% or more, more preferably of 88% or more, still more preferably of 90% or more. If the light transmittance of the transparent electrically-conductive film is less than 86%, the touch panel formed with the transparent electrically-conductive film according to the invention can produce a low-brightness display and can cause a problem with optical properties.

The transparent electrically-conductive film of the invention is suitable for use as a panel plate in touch panels. Specifically, a touch panel may include a pair of panel plates each with a transparent electrically-conductive thin layer, which are arranged opposite to each other through a spacer S in such a manner that the stripe-shaped transparent electrically-conductive thin layers are orthogonal and opposite to each other. In such a touch panel, the transparent electrically-conductive film as described above may be used as one of the panel plates (generally the upper panel plate to be pressed). Such a touch panel functions as a transparent switch structure in which contact between the transparent electrically-conductive thin layers by tapping on the upper panel side against the elastic force of the spacer produces the ON state of an electric circuit, while removal of the press turns it to the original OFF state. The transparent electrically-conductive film of the invention may be used for either one of the upper and lower panel plates in the touch panel, while the other panel plate may be a transparent substrate of a plastic film, a glass plate or the like, which is provided with a transparent electrically-conductive thin layer. Alternatively, the transparent electrically-conductive film of the invention may be used for both of the upper and lower plates.

EXAMPLES

The invention is more specifically described below by showing some examples of the invention. Hereinafter, the term "part or parts" means part or parts by weight. The index of light refraction (refractive index) is a value measured with an Abbe refractometer at 25° C.

Example 1

Formation of Electrically-Conductive Thin Layer

A transparent electrically-conductive thin layer made of a 25 nm-thick ITO layer (with a refractive index of 2.00) was formed on one side of a 25 μm-thick polyethylene terephthalate film (PET Film 1) by a reactive sputtering method using a sintered material composed of 90% by weight of indium oxide and 10% by weight of tin monoxide in a $4 \times 10^3$ Torr atmosphere composed of 80% argon gas and 20% oxygen gas.
(Formation of Hard Coat Layer)

A toluene solution was prepared by adding 5 parts of a photo polymerization initiator of hydroxycyclohexyl phenyl ketone (Irgacure 184 manufactured by Ciba Specialty Chemicals Inc.) to 100 parts of an acrylic urethane resin (Unidic 17-806 manufactured by Dainippon Ink and Chemicals, Incorporated) and diluting the mixture with toluene to a concentration of 50% by weight. The toluene solution was applied to one side of a 125 μm-thick polyethylene terephthalate film (PET Film 2), dried at 100° C. for 3 minutes and then immediately irradiated with ultraviolet light from two ozone-type high-pressure mercury lamps (each 80 W/cm, 15 cm focused radiation) to form a 5 μm-thick hard coat layer.
(Formation of SiO$_x$ Layer/Anti-Fouling Layer)

An 80 nm-thick SiO$_x$ layer (x: 1.8, with a refractive index of 1.8) was formed on the hard coat layer by a vacuum deposition method. A coating of a fluororesin (manufactured by Dainippon Ink and Chemicals, Incorporated) was further formed on the SiO$_x$ layer by a gravure coating method to give a 10 nm-thick anti-fouling layer.
(Preparation of Transparent Electrically-Conductive Film)

A transparent acrylic pressure-sensitive adhesive layer (a mixture of 1 part of an isocyanate crosslinking agent and 100 parts of an acrylic copolymer of butyl acrylate, acrylic acid and vinyl acetate (100:2:5 in weight ratio)) with a controlled elastic modulus of 10 N/cm$^2$ was formed with a thickness of about 20 μm on the hard coat-free and SiO$_x$ layer-free side of the PET Film 2. The transparent electrically-conductive thin layer-free side of the PET Film 1 was attached to the surface of the pressure-sensitive adhesive layer so that a transparent electrically-conductive film was prepared. The elastic modulus (dynamic storage modulus G') is a value determined by temperature variance measurement at a frequency of 1 Hz and 20° C. with a viscoelastic spectrometer (ARES system manufactured by Rheometric Scientific Ltd.).
(Preparation of Touch Panel)

The resulting transparent electrically-conductive film was used as one of the panel plates. A glass plate on which a 30 nm-thick ITO thin layer was formed by the same method as described above was used as the other panel plate. Both panel plates were arranged opposite to each other with a 10 μm-thick spacer placed therebetween in such a manner that the ITO thin layers were opposite to each other, so that a touch panel for serving as a switch structure was prepared. The ITO thin layers on both panel plates were previously provided with silver electrodes orthogonal to each other, respectively, before they were arranged opposite to each other.

Example 2

A transparent electrically-conductive film and a touch panel were prepared using the process of Example 1, except that the thickness of the SiO$_x$ layer was set at 30 nm.

Example 3

A transparent electrically-conductive film and a touch panel were prepared using the process of Example 1, except that the thickness of the SiO, layer was set at 150 nm.

Example 4

A transparent electrically-conductive film and a touch panel were prepared using the process of Example 1, except that a thermosetting resin layer was formed as described below when the ITO layer was formed on the PET Film 1 and that a silica coat layer (SiO$_2$, index of light refraction n=1.46) was formed by a silica coating process before the ITO layer was formed. The thermosetting resin layer formed was a 150 nm-thick layer of a thermosetting resin composed of a melamine resin, an alkyd resin and an organic silane condensate (2:2:1 in weight ratio) (index of light refraction n=1.54). A silica sol (COLCOAT P manufactured by COLCOAT CO., Ltd.) was diluted with ethanol to a solids content of 2% by weight. The diluted material was applied to the thermosetting resin layer and then dried and cured at 150° C. for 2 minutes to form an about 30 nm-thick silica coat layer.

Example 5

A transparent electrically-conductive film and a touch panel were prepared using the process of Example 1, except that the SiO$_x$ layer was formed by sequentially depositing two layers: an 80 nm-thick SiO$_x$ layer (x: 1.8, with a refractive index of 1.8) and then a 70 nm-thick SiO$_x$ layer (x: 2.0, with a refractive index of 1.46), on the hard coat layer by a vacuum deposition method.

Example 6

A transparent electrically-conductive film was prepared using the process of Example 4, except that the SiO$_x$ layer was formed by sequentially depositing two layers: an 80 nm-thick SiO$_x$ layer (x: 1.8, with a refractive index of 1.8) and then a 70 nm-thick SiO$_x$ layer (x: 2.0, with a refractive index of 1.46), on the hard coat layer by a vacuum deposition method. A touch panel was also prepared using the transparent electrically-conductive film in the same manner as Example 1.

Example 7

A transparent electrically-conductive film was were prepared using the process of Example 4, except that the SiO$_x$ layer was formed by sequentially depositing three layers: an 100 nm-thick SiO$_x$ layer (x: 1.9, with a refractive index of 1.6), an 80 nm-thick SiO$_x$ layer (x: 1.8, with a refractive index of 1.80), and then a 70 nm-thick SiO$_x$ layer (x: 2.0, with a refractive index of 1.46), on the hard coat layer by a vacuum deposition method. A touch panel was also prepared using the transparent electrically-conductive film in the same manner as Example 1.

Example 8

A transparent electrically-conductive film was were prepared using the process of Example 4, except that the SiO$_x$ layer was formed by sequentially depositing four layers: an 25 nm-thick SiO$_x$ layer (x: 1.8, with a refractive index of 1.80), an 25 nm-thick SiO$_x$ layer (x: 2.0, with a refractive index of 1.46), an 80 nm-thick SiO$_x$ layer (x: 1.8, with a refractive index of 1.80), and then a 70 nm-thick SiO$_x$ layer (x: 2.0, with a refractive index of 1.46), on the hard coat layer by a vacuum deposition method. A touch panel was also prepared using the transparent electrically-conductive film in the same manner as Example 1.

Comparative Example 1

A transparent electrically-conductive film and a touch panel were prepared using the process of Example 1, except that a silica coat layer (SiO$_2$) was formed on the hard coating by a silica coating process (wet process) in place of the SiO$_x$ layer formed by vacuum deposition. In the silica coating process, a silica sol (COLCOAT P manufactured by COLCOAT CO., Ltd.) was diluted with ethanol to a solids content of 2% by weight, and the diluted material was dried and cured at 150° C. for 2 minutes to form an 80 nm-thick silica coat layer.

Comparative Example 2

A transparent electrically-conductive film and a touch panel were prepared using the process of Example 1, except that the SiO$_x$ layer was not formed.

Comparative Example 3

A transparent electrically-conductive film and a touch panel were prepared using the process of Example 1, except that the thickness of the SiO$_x$ layer was set at 5 nm.

Comparative Example 4

A transparent electrically-conductive film and a touch panel were prepared using the process of Example 4, except that the SiO$_x$ layer was not formed.

The composition of each of the transparent electrically-conductive films obtained in the examples and the comparative examples is shown in Table 1. The surface resistance, light transmittance, curling properties, and water vapor transmission rate of the transparent electrically-conductive films were determined by the methods described below. The results are shown in Table 2.

<Surface Resistance>

The surface resistance (Ω/square) of the film was measured using a two-terminal method.

<Light Transmittance>

Visible light transmittance was measured at a light wavelength of 550 nm using a spectrophotometer UV-240 manufactured by Shimadzu Corporation.

<Curling Properties>

The transparent electrically-conductive film was cut into a 10 cm square piece. The piece was heated at 150° C. for 1 hour and allowed to stand at an ordinary temperature and an ordinary humidity (23° C. and 50% RH) for 1 hour. Thereafter, the piece was allowed to stand for 30 minutes in an environment at a temperature of 60° C. and a humidity of 95% RH and then placed on a level support plate such that the transparent electrically-conductive thin layer faced upward, when the distance from the support plate to each of the four corners of the transparent electrically-conductive film was measured. The maximum of the distances was defined as the curl height (mm).

<Water Vapor Transmission Rate>

The water vapor transmission rate was determined according to JIS Z 0208. Specifically, a moisture permeable cup made of aluminum was used in which a certain amount of a moisture absorbent (calcium chloride) was placed. The transparent electrically-conductive film was placed over the opening of the cup, and the interstices therebetween were sealed with wax. The moisture permeable cup was then placed in a thermo-hygrostat at 40° C. and 90% RH, while its weight was measured over time. The measured gradient (A) and the formula below were used to determine the water vapor transmission rate. The smaller value of the water vapor transmission rate can be evaluated as indicating better water vapor barrier properties.

When the water vapor transmission rate from the SiO$_x$ layer side was determined as described above, the transparent electrically-conductive film before the formation of the antifouling layer was used, and the SiO$_x$ layer side was placed opposite to the opening of the moisture permeable cup and sealed with wax. On the other hand, when the water vapor transmission rate from the ITO side was determined as described above, the ITO thin layer side of the transparent electrically-conductive film was placed opposite to the opening of the moisture permeable cup and sealed with wax.

Water Vapor Transmission Rate $(g/(m^2 \cdot 24 \, hr \cdot atm)) = A(g/hr)/(\pi \times 0.03 \times 0.03) \times 24(hr) \times 1 (atm)$

TABLE 1

| | ITO layer (nm) | Anchor Layer (nm) | | PET Film 1 (μm) | Pressure-Sensitive Adhesive Layer (μm) | PET Film 2 (μm) |
| | | Silica Coat Layer | Thermo-setting Resin Layer | | | |
|---|---|---|---|---|---|---|
| Example 1 | 25 | — | — | 25 | 20 | 125 |
| Example 2 | 25 | — | — | 25 | 20 | 125 |
| Example 3 | 25 | — | — | 25 | 20 | 125 |

TABLE 1-continued

| | | | | | | |
|---|---|---|---|---|---|---|
| Example 4 | 25 | 30 | 150 | 25 | 20 | 125 |
| Example 5 | 25 | — | — | 25 | 20 | 125 |
| Example 6 | 25 | 30 | 150 | 25 | 20 | 125 |
| Example 7 | 25 | 30 | 150 | 25 | 20 | 125 |
| Example 8 | 25 | 30 | 150 | 25 | 20 | 125 |
| Comparative Example 1 | 25 | — | — | 25 | 20 | 125 |
| Comparative Example 2 | 25 | — | — | 25 | 20 | 125 |
| Comparative Example 3 | 25 | — | — | 25 | 20 | 125 |
| Comparative Example 4 | 25 | 30 | 150 | 25 | 20 | 125 |

| | Hard Coat Layer (μm) | $SiO_x$ Layer | | | | Anti-Fouling Layer (nm) |
|---|---|---|---|---|---|---|
| | | Layer Forming Method | Number of Layers | Total Layer Thickness (Each Layer Thickness in the Order From Hard Coat Layer) (nm) | Refractive Index of Each Layer in the Order From Hard Coat Layer | |
| Example 1 | 5 | Vacuum Deposition | 1 | 80 | 1.8 | 10 |
| Example 2 | 5 | Vacuum Deposition | 1 | 30 | 1.8 | 10 |
| Example 3 | 5 | Vacuum Deposition | 1 | 150 | 1.8 | 10 |
| Example 4 | 5 | Vacuum Deposition | 1 | 80 | 1.8 | 10 |
| Example 5 | 5 | Vacuum Deposition | 2 | 150 (80/70) | 1.8/1.46 | 10 |
| Example 6 | 5 | Vacuum Deposition | 2 | 150 (80/70) | 1.8/1.46 | 10 |
| Example 7 | 5 | Vacuum Deposition | 3 | 250 (100/80/70) | 1.6/1.8/1.46 | 10 |
| Example 8 | 5 | Vacuum Deposition | 4 | 200 (25/25/80/70) | 1.8/1.46/1.8/1.46 | 10 |
| Comparative Example 1 | 5 | Silica Coating | 1 | 80 | 1.8 | 10 |
| Comparative Example 2 | 5 | — | — | — | — | 10 |
| Comparative Example 3 | 5 | Vacuum Deposition | 1 | 5 | 1.8 | 10 |
| Comparative Example 4 | 5 | — | — | — | — | 10 |

TABLE 2

| | Surface Resistance (Ω/square) | Transmittance (%) | Curl Height (mm) | Water Vapor Transmission Rate (g/(m²·24 hr·atm)) | |
|---|---|---|---|---|---|
| | | | | $SiO_x$ Layer | ITO Thin Layer Side |
| Example 1 | 300 | 88 | 2 | 0.8 | 0.8 |
| Example 2 | 300 | 88 | 3 | 1.0 | 0.8 |
| Example 3 | 300 | 88 | 2 | 0.9 | 0.8 |
| Example 4 | 300 | 90 | 1 | 0.8 | 0.8 |
| Example 5 | 300 | 90 | 2 | 0.8 | 0.8 |
| Example 6 | 300 | 92 | 2 | 0.8 | 0.8 |
| Example 7 | 300 | 93 | 1 | 0.8 | 0.8 |
| Example 8 | 300 | 94 | 1 | 0.8 | 0.8 |
| Comparative Example 1 | 300 | 88 | 15 | 4.0 | 0.8 |
| Comparative Example 2 | 300 | 88 | 20 | 5.6 | 0.8 |
| Comparative Example 3 | 300 | 88 | 10 | 3.0 | 0.8 |
| Comparative Example 4 | 300 | 90 | 20 | 5.6 | 0.8 |

Tables 1 and 2 indicate that Examples 1 to 8 provide small curl heights and reduce waving or curling to low levels even in a high-temperature, high-humidity environment as compared with Comparative Examples 1 to 4. It is also demonstrated that the transmittance and the anti-reflection function are improved in Examples 5 to 8 as compared with Examples 1 to 4.

INDUSTRIAL APPLICABILITY

The transparent electrically-conductive film of the invention is useful for transparent electrodes in touch panels and advanced display systems such as liquid crystal displays and electroluminescence displays and suitable for electromagnetic wave shielding and prevention of static charge of transparent products, and the like.

The invention claimed is:

1. A transparent electrically-conductive film, comprising:
   a transparent film substrate;
   a hard coat layer formed on one side of the transparent film substrate;
   a $SiO_x$ layer with a thickness of 10 nm to 300 nm that is formed on the hard coat layer by a dry process; and
   a transparent electrically-conductive thin layer with a thickness of 20 nm to 35 nm that is formed on another side of the transparent film substrate.

2. The transparent electrically-conductive film according to claim 1, wherein a water vapor transmission rate of the $SiO_x$ layer side of the transparent electrically-conductive film is 2 g/(m²·24 h·atm) or less.

3. The transparent electrically-conductive film according to claim 1, further comprising an anti-fouling layer on the $SiO_x$ layer.

4. The transparent electrically-conductive film according to claim 1, wherein the transparent film substrate is a laminate of at least two transparent film substrates that are bonded to one another through a transparent adhesive layer.

5. The transparent electrically-conductive film according to claim 1, wherein the transparent electrically-conductive thin layer is made of indium tin oxide.

6. The transparent electrically-conductive film according to claim 1, wherein the $SiO_x$ layer has a refractive index of 1.40 to 2.00.

7. The transparent electrically-conductive film according to claim 6, wherein at least a $SiO_x$ layer (1) whose refractive index is adjusted to 1.7 to 1.9 and a $SiO_x$ layer (2) whose refractive index is adjusted to 1.4 to 1.49 are laminated in this order from the hard coat layer side to form the $SiO_x$ layer.

8. The transparent electrically-conductive film according to claim 6, wherein a $SiO_x$ layer (3) whose refractive index is adjusted to 1.5 to 1.69, a $SiO_x$ layer (1) whose refractive index is adjusted to 1.7 to 1.9 and a $SiO_x$ layer (2) whose refractive index is adjusted to 1.4 to 1.49 are laminated in this order from the hard coat layer side to form the $SiO_x$ layer which comprises three layers.

9. The transparent electrically-conductive film according to claim 6, wherein a $SiO_x$ layer (1) whose refractive index is adjusted to 1.7 to 1.9 and a $SiO_x$ layer (2) whose refractive index is adjusted to 1.4 to 1.49 are alternately laminated twice in this order from the hard coat layer side to form the $SiO_x$ layer which comprises four layers in total.

10. A touch panel, comprising:
a pair of panel plates each having a transparent electrically-conductive thin layer; and
a spacer through which the pair of panel plates are arranged opposite to each other in such a manner that the transparent electrically-conductive thin layers are placed opposite to each other, wherein
at least one of the panel plates is the transparent electrically-conductive film according to claim 1.

11. A touch panel, comprising:
a pair of panel plates each having a transparent electrically-conductive thin layer; and
a spacer through which the pair of panel plates are arranged opposite to each other in such a manner that the transparent electrically-conductive thin layers are placed opposite to each other, wherein
at least one of the panel plates is the transparent electrically-conductive film according to claim 2.

12. A touch panel, comprising:
a pair of panel plates each having a transparent electrically-conductive thin layer; and
a spacer through which the pair of panel plates are arranged opposite to each other in such a manner that the transparent electrically-conductive thin layers are placed opposite to each other, wherein
at least one of the panel plates is the transparent electrically-conductive film according to claim 3.

13. A touch panel, comprising:
a pair of panel plates each having a transparent electrically-conductive thin layer; and
a spacer through which the pair of panel plates are arranged opposite to each other in such a manner that the transparent electrically-conductive thin layers are placed opposite to each other, wherein
at least one of the panel plates is the transparent electrically-conductive film according to claim 4.

14. A touch panel, comprising:
a pair of panel plates each having a transparent electrically-conductive thin layer; and
a spacer through which the pair of panel plates are arranged opposite to each other in such a manner that the transparent electrically-conductive thin layers are placed opposite to each other, wherein
at least one of the panel plates is the transparent electrically-conductive film according to claim 5.

15. A touch panel, comprising:
a pair of panel plates each having a transparent electrically-conductive thin layer; and
a spacer through which the pair of panel plates are arranged opposite to each other in such a manner that the transparent electrically-conductive thin layers are placed opposite to each other, wherein
at least one of the panel plates is the transparent electrically-conductive film according to claim 6.

16. A touch panel, comprising:
a pair of panel plates each having a transparent electrically-conductive thin layer; and
a spacer through which the pair of panel plates are arranged opposite to each other in such a manner that the transparent electrically-conductive thin layers are placed opposite to each other, wherein
at least one of the panel plates is the transparent electrically-conductive film according to claim 7.

17. A touch panel, comprising:
a pair of panel plates each having a transparent electrically-conductive thin layer; and
a spacer through which the pair of panel plates are arranged opposite to each other in such a manner that the transparent electrically-conductive thin layers are placed opposite to each other, wherein
at least one of the panel plates is the transparent electrically-conductive film according to claim 8.

18. A touch panel, comprising:
a pair of panel plates each having a transparent electrically-conductive thin layer; and
a spacer through which the pair of panel plates are arranged opposite to each other in such a manner that the transparent electrically-conductive thin layers are placed opposite to each other, wherein
at least one of the panel plates is the transparent electrically-conductive film according to claim 9.

* * * * *